Nov. 27, 1951  E. W. MOORE  2,576,849
LIGHT SIGNAL FOR RAILROADS
Filed Oct. 21, 1948
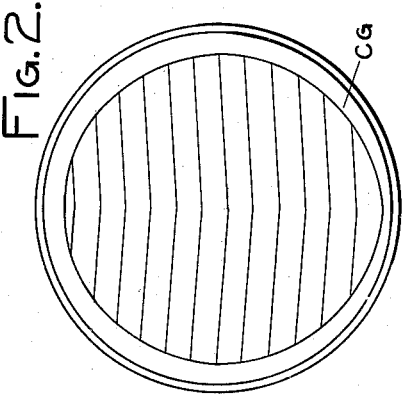
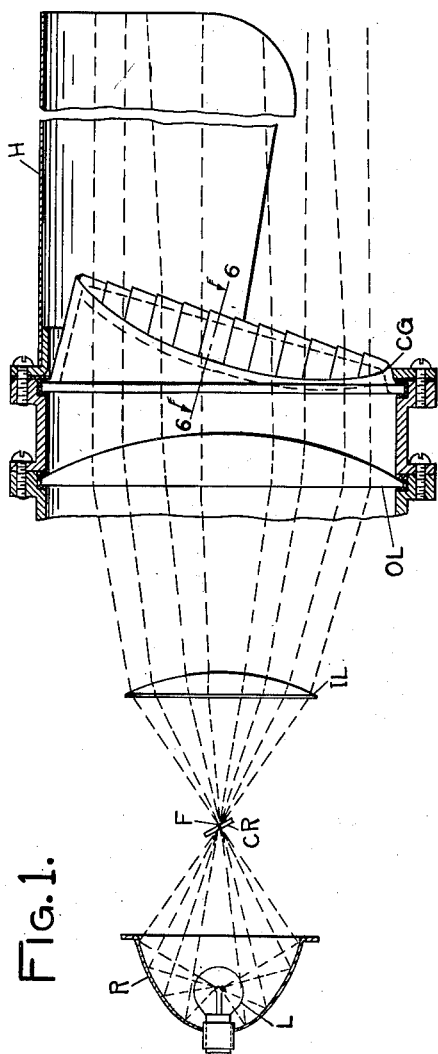
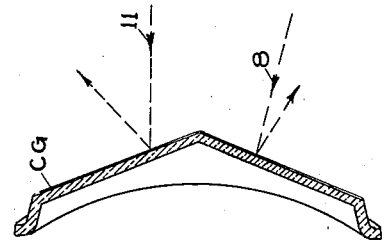
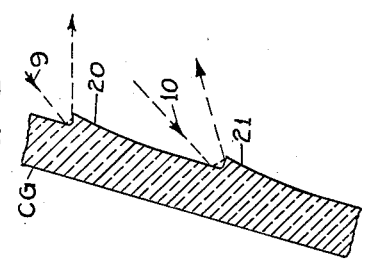
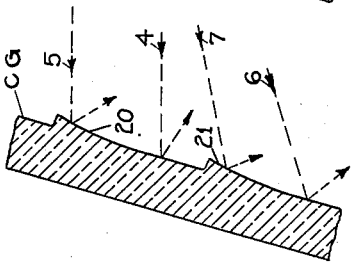
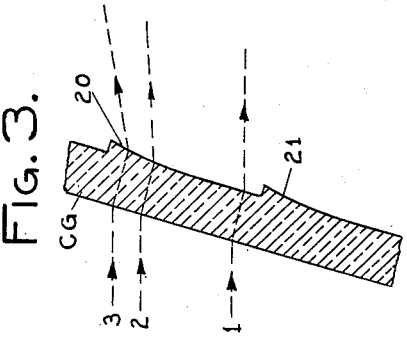
INVENTOR.
E. W. Moore,
BY Neil W. Preston,
HIS ATTORNEY Patented Nov. 27, 1951

2,576,849

UNITED STATES PATENT OFFICE 2,576,849

LIGHT SIGNAL FOR RAILROADS

Edmund W. Moore, Rochester, N. Y., assignor to General Railway Signal Company, Rochester, N. Y.

Application October 21, 1948, Serial No. 55,723

6 Claims. (Cl. 177—329)

This invention relates to an improved type of cover glass of the kind ordinarily used on railway signals, and more particularly pertains to the type of cover glass employed on low or "dwarf" signals.

In the use of dwarf signals, provided with the conventional flat type of cover glass, much difficulty has been encountered by the fact that this type of cover glass has the undesirable property of reflecting, in the direction of propagation of the signal beam, a large amount of the light which impinges upon the cover glass from some external source. This has been the case even when a hood or shade has been provided for the signal as it is, of course, impossible to cover the signal with a hood of such a size as to reduce the visibility of the signal to the observer. Thus, it frequently occurs that a headlight, or the sun, may shine directly onto the cover glass even when a hood is employed and when this external light impinges upon the face of the cover glass at some certain angle, which angle depends upon the particular design of the cover glass and the location of the signal, it may be reflected along the beam of the signal.

In the use of color light signals, the aspect of a signal is determined by whether or not the incandescent lamp contained within the signal housing is illuminated at any one moment. In the case of searchlight-type signals, the particular aspect of a signal is determined by that particular roundel which is at the moment in the path of the light beam. However, emission of reflected light from the cover glass of either a color light or a searchlight-type signal along the beam of the signal causes dilution of the aspect and may in some cases render the aspect practically indiscernible. In the event that the reflection is of sufficient brilliance, it may dilute the aspect sufficiently to cause a red aspect to appear yellow and thus create a dangerous condition.

The cover glass of the present invention provides a distinct improvement over those of the prior art in that it effectively reduces reflections along the direction of the signal beam, and yet it can be produced in an economical manner.

Various other objects, characteristics, and attributes of the present invention will be in part pointed out, and in part apparent as the description of one specific embodiment of the invention progresses.

The accompanying drawings illustrate one specific embodiment of the invention for one particular field of application, the cover glass being illustrated in a manner to facilitate an understanding of the nature of the invention rather than to show the exact structural details preferably employed in practice.

Fig. 1 illustrates diagrammatically the optical system of one particular type of searchlight signal employing the cover glass of the present invention;

Fig. 2 is a drawing illustrating a front view of such cover glass;

Fig. 3 illustrates diagrammatically an enlarged sectional view of a portion of the face of the cover glass shown in Fig. 2, and illustrates the manner in which some of the light rays passing through the cover glass are refracted upwardly;

Fig. 4 illustrates diagrammatically an enlarged sectional portion of the cover glass and shows the manner in which light rays from an external source are reflected by the flutes of the cover glass in the vertical plane;

Fig. 5 illustrates diagrammatically an enlarged sectional portion of the face of the same cover glass and demonstrates the manner in which light rays from an external source are reflected by the projections or "risers" caused by the flutes on the face of the cover glass; and, Fig. 6 illustrates diagrammatically a horizontal sectional view of the cover glass shown in Fig. 2 and shows the manner in which light rays from an external source are reflected by the face of the cover glass in the horizontal plane.

Reference to Fig. 1 shows the manner in which light rays from an incandescent lamp L, located at the focus of an elliptical reflector R, are so reflected by the elliptical reflector as to come to a focus at a point F which is the outer focus of the elliptical reflector. At this outer focus F, a colored roundel CR is placed to give the light emitted by the signal the proper color. After passing through the colored roundel CR, the light rays again diverge until they strike the plano-convex inner lens IL which reduces the divergence of the rays of the beam. The light rays are again refracted and made parallel by the action of plano-convex outer lens OL. The light rays then pass through the cover glass CG which is provided with a hood H in order to keep as much external light from shining on the face of the cover glass as possible. As may be seen from Fig. 1, some of the light rays are refracted slightly upwards by the action of the cover glass as will subsequently be made clear. Also, Fig. 1 illustrates the way in which the face of the cover glass is tilted downwardly at a suitable angle with the vertical, such as an angle of fifteen degrees. Fig. 6, which is top cross-sectional view of the cover glass CG, clearly indicates the V-type construction of the cover glass.

An enlarged view of a portion of the cover glass of the present invention is shown in Fig. 3. All of the light rays 1, 2, and 3 from the lamp L shown impinging upon the cover glass from the left are traveling in a horizontal direction due to the converging action of the lenses IL and OL, as previously described. Since glass is a denser medium than air, these rays are refracted downward toward the normal when they enter the surface of the cover glass. However, because the flutes 20 and 21 on the face of the cover glass produce the effect of a prism over a portion of the face of the cover glass, all of the rays 1, 2 and 3 passing through the cover glass are not refracted upwardly an equal amount upon leaving the cover glass. Thus, it is evident that the light ray designated by reference character 1 is refracted upward, away from the normal upon leaving the glass by the same amount that it was refracted downward upon entering the glass so that its direction is unchanged. This is due to the fact that at this region of the cover glass the sides of the cover glass are parallel to each other. But the light ray 2 is refracted upward by a greater amount than it was refracted downward so that its direction, upon leaving the cover glass has been changed. Likewise, the light ray 3 is refracted upward by an even greater amount because the angle between the surface of the glass is even greater at this location. Thus, it is apparent that, although the presence of the flutes upon the face of the cover glass acts in such a manner as to divert a portion of the beam of light upward, the inclination of the cover glass, in itself, has no effect on the refraction of the light beam as evidenced by the path of light ray 1. It can thus be seen that the spread of the beam and the proportion of light involved in the spread can be determined by selecting the ratio between the flat portion of the cover glass and its flutes.

Ordinarily very little external light impinges upon the face of the cover glass coming from a direction which is below the horizontal. This is especially true in the case of dwarf signals which are located close to the ground. Therefore, it is apparent that the cover glass CG need be effective in dispersing reflected light only for those rays of light which strike the cover glass from a horizontal direction or from above the horizontal. Reference to Fig. 4, clearly indicates the manner in which an external light ray 4, striking the cover glass CG horizontally, is reflected downwardly. Horizontal ray 5 which impinges upon the fluted portion of the face of the cover glass CG is reflected downward at an even greater angle than is ray 4. Rays coming from above the horizontal and striking, either upon the flat or the fluted portion of the face of the cover glass, are reflected downwardly to an even greater extent than the horizontal rays. This is made clear by rays 6 and 7 of Fig. 4. Thus, it is obvious that inclining the cover glass away from the vertical greatly reduces the possibility of light from an external source being reflected along the beam of the signal and that this effect is influenced by the presence of the flutes only to the extent that the flutes cause the light to be reflected even more downwardly.

Fig. 5, illustrates the manner in which reflections may occur from the risers or steps of a cover glass which has been fluted. When light rays from an external source impinge upon these risers with the proper angle as do rays 9 and 10 of Fig. 5, these rays may be reflected directly along the beam of the signal and cause a dilution of the beam. But, as is shown in Fig. 6, the cover glass CG of the present invention surmounts this difficulty by means of the fact that the face of the cover glass consists, in effect, of two intersecting planes forming a V-shaped surface. By means of this particular structure, light rays impinging upon the face of the cover glass from the front such as ray 11 are reflected outwardly, out of the beam of the signal, and light rays impinging upon the cover glass from some other angle such as ray 8 are either reflected back upon themselves or off to some other angle out of the beam of the signal. This is true both for the light rays impinging upon the face of the cover glass as shown in Fig. 4 and for the light rays impinging upon the steps of the flutes as shown in Fig. 5. Only rays which might strike the cover glass from an angle far to the side could be reflected into the direction of the beam, but these rays from the side are largely prevented from striking the cover glass by the hood H. Also, regardless of the direction of an external light source with respect to the cover glass, only one half of the surface of the cover glass at most can be at such an angle as to reflect light rays into the signal beam even with the hood removed, as the other half of the cover glass is necessarily at a different angle to such an external source of light.

It has been determined that the best results are obtained when the faces of the cover glass make an angle of approximately 130° with each other. The reason for this is, that with any larger dihedral angle formed by the intersecting planes of the cover glass, light may be reflected from an external source in such a direction as to cause dilution of the beam to an observer who is approaching the signal along a curve. Substantially reducing the angle between the planes of the face not only increases the amount of glass required for a given diameter cover glass but may also exceed the critical reflection angle for the type of glass used and prevent the desired signal beam from passing through the cover glass. However, although the preferred embodiment employs an angle of 130°, it is to be understood that the invention can well be practiced with the use of other angles.

It should be remembered that Figs. 4 and 6 each show the direction of reflected light in one plane only. Thus, light rays from an external source are not only reflected downwardly as shown in Fig. 4, but outwardly as well as shown in Fig. 6. Although the cover glass is V-shaped and tilted with respect to the vertical so that it is not perpendicular to the desired signal beam, this fact alone has no effect upon the refraction of the desired light beam. The fact that a portion of the light beam is reflected upwardly is due only to the presence of the flutes upon the face of the cover glass. Also, it should be remembered that the presence of the flutes upon the face of the cover glass is not an essential element of this invention but that the flutes have been employed in the embodiment described herein to clearly illustrate their relation to the V-shaped tilted cover glass of the present invention.

Thus, the cover glass of the present invention provides an improved means for preventing the reflection of light rays, impinging upon the face of the cover glass from an external source such as the sun or a headlight, in the direction of the beam of the signal. By doing so, it greatly reduces the color dilution of either a searchlight-type or a color light signal which ordinarily renders the aspect of such signals less discernible, and which in some cases might even produce the effect of changing the aspect.

It is to be understood that, although the cover glass of the present invention is shown as being associated with a searchlight-type signal, this type of cover glass is equally effective when used in connection with other types of signals such as color light signals.

Having described a cover glass for dwarf signals as one specific embodiment of the present invention, it is desired to be understood that this form is selected to facilitate in the disclosure of the invention rather than to limit the number of forms which it may assume; and, it is to be further understood that various modifications, adaptations, and alterations may be applied to the specific form shown to meet the requirements of practice without in any manner departing from the spirit or scope of the present invention.

What I claim is:

1. A light signal comprising in combination, a cover glass associated with a source of projected light, said cover glass having its light passing surfaces comprising two intersecting planes, the line forming the intersection of said intersecting planes being inclined away from the vertical in such a manner that the upper portion of said intersecting planes projects outwardly in the direction of the projected beam farther than does the lower portion of said intersecting planes, and with said intersecting planes forming dihedral angles with the smaller of said dihedral angles facing toward the source of the projected beam.

2. A light signal comprising, a cover glass associated with a light source, said cover glass having its light passing surfaces comprising two intersecting planes, said planes being provided with horizontal flutes over a portion of their surfaces, said flutes being of prismatic form so as to refract a portion of the transmitted beam out of the axis of the main projected beam as desired, said intersecting planes being tilted from the vertical and forming a dihedral angle thereby providing a means whereby external light rays travelling substantially along the axis of the projected light beam and impinging upon the outer surface of said cover glass are reflected downwardly out of the axis of the projected beam because of the tilted position of the cover glass, and also are reflected laterally out of the axis of the projected beam because of the V-shaped characteristic formed by the intersecting planes.

3. In a light signal, a source of light having its rays directed in a beam, a cover glass for spreading the light beam comprising, a vertical supporting ring, a protruding hood-shaped supporting portion attached to said ring, and a light projecting portion connected to said supporting portion and comprising two flat glass members having flutes for spreading a light beam, said two members being in two different planes and intersecting to form an obtuse angle, the apex of which points away from said supporting portion.

4. In a light signal constructed to avoid phantom indications, a light source, a reflector, a color filter, and a lens system including a cover glass, all cooperating to project a colored beam of light, said cover glass being mounted on the outside of said lens system and constructed of two glass portions each having a plurality of flutes effective to spread the light beam, said glass portions being generally flat and located in planes relative to each other to form a dihedral angle with its apex extending outwardly of the signal and its axis from its top being inclined outwardly away from the vertical, whereby light rays from an external source are reflected by the surfaces of said cover glass in directions away from the projected light beam of the signal to thereby avoid the dilution of the true color of the projected light beam.

5. In a light signal constructed to avoid phantom indications, a light source, a lens system for projecting the light from said source, said lens system including a cover glass formed of two flat glass portions located at an oblique angle with respect to each other and with the apex of the angle extending outwardly of the signal, the axis of the angle being inclined away from the vertical in the order of 15°, whereby light rays from an external source impinging on the surfaces of said cover glass are reflected away from the projected light beam.

6. In a light signal constructed to avoid phantom indications, a light source, a lens system including a cover glass for projecting light from said source in a beam having a generally horizontal axis, a hood extending outwardly from said signal above said lens system to prevent external light from falling on said cover glass from a source located at any substantial degree above the horizontal, said cover glass being formed of two relatively flat portions of glass located in inclined planes intersecting to form an oblique angle with its apex pointing away from the signal and the line of intersection of said two portions being inclined away from the vertical at its upper end to a limited degree, whereby light rays from an external source located adjacent the axis of the light beam of the signal impinge upon the surfaces of the cover glass at such an angle as to be reflected away from the light beam of the signal.

EDMUND W. MOORE.

REFERENCES CITED

The following references are of record in the file of this patent:

UNITED STATES PATENTS

| Number | Name | Date |
|---|---|---|
| 826,205 | Whitehouse | July 17, 1906 |
| 1,589,370 | Conover | June 22, 1926 |
| 1,782,732 | Lebby | Nov. 25, 1930 |
| 1,806,051 | Fisher et al. | May 19, 1931 |
| 1,942,136 | Carter et al. | Jan. 2, 1934 |
| 2,286,201 | Farrand et al. | June 16, 1942 |
| 2,413,127 | Wells | Dec. 24, 1946 |